US009361422B2

(12) United States Patent
Word et al.

(10) Patent No.: US 9,361,422 B2
(45) Date of Patent: Jun. 7, 2016

(54) FRAGMENTATION POINT AND SIMULATION SITE ADJUSTMENT FOR RESOLUTION ENHANCEMENT TECHNIQUES

(71) Applicant: Mentor Graphics Corporation, Wilsonville, OR (US)

(72) Inventors: James Word, Portland, OR (US); Nicolas B. Cobb, Sunnyvale, CA (US); Patrick J. LaCour, McKinney, TX (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 14/059,183

(22) Filed: Oct. 21, 2013

(65) Prior Publication Data

US 2014/0143741 A1    May 22, 2014

Related U.S. Application Data

(60) Division of application No. 12/972,097, filed on Dec. 17, 2010, now Pat. No. 8,566,753, which is a continuation of application No. 11/067,504, filed on Feb. 25, 2005, now Pat. No. 7,861,207.

(60) Provisional application No. 60/564,138, filed on Apr. 21, 2004, provisional application No. 60/547,484, filed on Feb. 25, 2004.

(51) Int. Cl.
*G06F 17/50* (2006.01)

(52) U.S. Cl.
CPC ........ *G06F 17/5081* (2013.01); *G06F 17/5072* (2013.01); *G06F 2217/12* (2013.01); *Y02P 90/265* (2015.11)

(58) Field of Classification Search
CPC .......... G03F 1/36; G03F 7/70; G06F 17/5081

USPC ...................... 716/50–55, 106, 110
See application file for complete search history.

(56) References Cited

U.S. PATENT DOCUMENTS 4,532,650 A    7/1985 Wihl et al.
4,762,396 A    8/1988 Dumant et al.
(Continued)

FOREIGN PATENT DOCUMENTS

JP      09319067 A    12/1997
JP    11-102380 A     4/1999
(Continued)

OTHER PUBLICATIONS

Cobb, N.B., "Fast Optical and Process Proximity Correction Algorithms for Integrated Circuit Manufacturing," Ph.D. dissertation, University of California at Berkeley, Spring 1998, pp. 64-71.
(Continued)

*Primary Examiner* — Paul Dinh
(74) *Attorney, Agent, or Firm* — Klarquist Sparkman, LLP

(57) ABSTRACT

A method of performing a resolution enhancement technique such as OPC on an initial layout description involves fragmenting a polygon that represents a feature to be created into a number of edge fragments. One or more of the edge fragments is assigned an initial simulation site at which the image intensity is calculated. Upon calculation of the image intensity, the position and/or number of initial simulation sites is varied. New calculations are made of the image intensity with the revised placement or number of simulation sites in order to calculate an OPC correction for the edge fragment. In other embodiments, fragmentation of a polygon is adjusted based on the image intensities calculated at the simulation sites. In one embodiment, the image intensity gradient vector calculated at the initial simulation sites is used to adjust the simulation sites and/or fragmentation of the polygon.

26 Claims, 8 Drawing Sheets

(56) References Cited

U.S. PATENT DOCUMENTS

| | | | |
|---|---|---|---|
| 4,989,156 A | 1/1991 | Ikenaga | |
| 5,502,654 A | 3/1996 | Sawahata | |
| 5,655,110 A | 8/1997 | Krivokapic et al. | |
| 5,699,447 A | 12/1997 | Alumot et al. | |
| 5,723,233 A | 3/1998 | Garza et al. | |
| 5,815,685 A | 9/1998 | Kamon | |
| 5,825,647 A | 10/1998 | Tsudaka | |
| 5,879,844 A | 3/1999 | Yamamoto et al. | |
| 5,991,006 A | 11/1999 | Tsudaka | |
| 6,016,357 A | 1/2000 | Neary et al. | |
| 6,033,814 A | 3/2000 | Burdorf et al. | |
| 6,049,660 A | 4/2000 | Ahn et al. | |
| 6,056,785 A | 5/2000 | Chisaka | |
| 6,077,310 A | 6/2000 | Yamamoto et al. | |
| 6,080,527 A | 6/2000 | Huang et al. | |
| 6,120,952 A | 9/2000 | Pierrat et al. | |
| 6,128,067 A | 10/2000 | Hashimoto | |
| 6,187,483 B1 | 2/2001 | Capodieci et al. | |
| 6,226,781 B1 | 5/2001 | Nistler et al. | |
| 6,243,855 B1 | 6/2001 | Kobayashi et al. | |
| 6,249,904 B1 | 6/2001 | Cobb | |
| 6,263,299 B1 | 7/2001 | Aleshin et al. | |
| 6,269,472 B1 | 7/2001 | Garza et al. | |
| 6,301,697 B1 | 10/2001 | Cobb | |
| 6,312,854 B1 | 11/2001 | Chen et al. | |
| 6,317,859 B1 | 11/2001 | Papadopoulou | |
| 6,350,977 B2 | 2/2002 | Taoka | |
| 6,370,679 B1 | 4/2002 | Chang et al. | |
| 6,425,117 B1 | 7/2002 | Pasch et al. | |
| 6,453,452 B1 | 9/2002 | Chang et al. | |
| 6,453,457 B1 | 9/2002 | Pierrat et al. | |
| 6,467,076 B1 | 10/2002 | Cobb | |
| 6,487,503 B2 | 11/2002 | Inui | |
| 6,499,003 B2 | 12/2002 | Jones et al. | |
| 6,643,616 B1 | 11/2003 | Granik et al. | |
| 6,649,309 B2 | 11/2003 | Mukherjee | |
| 6,665,845 B1 | 12/2003 | Aingaran et al. | |
| 6,668,367 B2 | 12/2003 | Cobb et al. | |
| 6,728,946 B1 | 4/2004 | Schellenberg et al. | |
| 6,792,159 B1 | 9/2004 | Aufrichtig et al. | |
| 6,792,590 B1 | 9/2004 | Pierrat et al. | |
| 6,815,129 B1 | 11/2004 | Bjorkholm et al. | |
| 6,851,103 B2 | 2/2005 | Van Den Broeke et al. | |
| 6,862,726 B2 | 3/2005 | Futatsuya et al. | |
| 6,928,634 B2 | 8/2005 | Granik et al. | |
| 6,989,229 B2 | 1/2006 | Lucas et al. | |
| 7,010,776 B2 | 3/2006 | Gallatin et al. | |
| 7,017,141 B2 | 3/2006 | Anderson et al. | |
| 7,043,712 B2 | 5/2006 | Mukherjee et al. | |
| 7,073,162 B2 | 7/2006 | Cobb et al. | |
| 7,080,349 B1 | 7/2006 | Babcock et al. | |
| 7,234,130 B2 | 6/2007 | Word et al. | |
| 7,237,221 B2 | 6/2007 | Granik et al. | |
| 7,240,321 B2 | 7/2007 | Cobb et al. | |
| 7,266,480 B2 | 9/2007 | Adam | |
| 7,280,945 B1* | 10/2007 | Weiner et al. | 703/2 |
| 7,293,249 B2 | 11/2007 | Torres Robles et al. | |
| 7,324,930 B2 | 1/2008 | Cobb | |
| 7,536,660 B2 | 5/2009 | Adam | |
| 7,539,954 B2 | 5/2009 | Adam | |
| 7,861,207 B2 | 12/2010 | Word et al. | |
| 8,566,753 B2 | 10/2013 | Word et al. | |
| 2001/0048478 A1 | 12/2001 | Taoka | |
| 2002/0076622 A1 | 6/2002 | Pierrat et al. | |
| 2002/0199157 A1 | 12/2002 | Cobb | |
| 2003/0048458 A1 | 3/2003 | Mieher et al. | |
| 2003/0103189 A1 | 6/2003 | Neureuther et al. | |
| 2003/0170551 A1 | 9/2003 | Futatsuya | |
| 2004/0005089 A1* | 1/2004 | Robles et al. | 382/141 |
| 2004/0019872 A1* | 1/2004 | Lippincott et al. | 716/21 |
| 2004/0088149 A1 | 5/2004 | Cobb | |
| 2004/0122636 A1 | 6/2004 | Adam | |
| 2004/0133871 A1* | 7/2004 | Granik et al. | 716/19 |
| 2005/0015233 A1 | 1/2005 | Gordon | |
| 2005/0044513 A1* | 2/2005 | Robles et al. | 716/4 |
| 2005/0050490 A1 | 3/2005 | Futatsuya et al. | |
| 2005/0055658 A1* | 3/2005 | Mukherjee et al. | 716/19 |
| 2005/0091014 A1 | 4/2005 | Gallatin et al. | |
| 2005/0097501 A1 | 5/2005 | Cobb | |
| 2005/0105180 A1 | 5/2005 | Mackey | |
| 2005/0132310 A1 | 6/2005 | Gallatin et al. | |
| 2005/0138596 A1 | 6/2005 | Medvedeva et al. | |
| 2005/0198598 A1 | 9/2005 | Adam | |
| 2005/0278685 A1* | 12/2005 | Granik et al. | 716/19 |
| 2005/0278686 A1 | 12/2005 | Word et al. | |
| 2005/0283747 A1 | 12/2005 | Adam | |
| 2006/0273255 A1 | 12/2006 | Volkov et al. | |
| 2006/0277520 A1 | 12/2006 | Gennari | |
| 2007/0006118 A1 | 1/2007 | Pierrat et al. | |
| 2008/0059939 A1 | 3/2008 | Gallatin et al. | |
| 2008/0256500 A1 | 10/2008 | Cobb et al. | |
| 2009/0217218 A1 | 8/2009 | Adam | |
| 2010/0030545 A1 | 2/2010 | Uno et al. | |

FOREIGN PATENT DOCUMENTS

| | | |
|---|---|---|
| JP | 2004-502961 A | 1/2004 |
| WO | WO 99/14637 A1 | 3/1999 |
| WO | WO 99/14638 A1 | 3/1999 |
| WO | WO 01/65315 A1 | 9/2001 |
| WO | WO 01/97096 A1 | 12/2001 |
| WO | WO/2005/082018 | 9/2005 |

OTHER PUBLICATIONS

Cobb, N., and A. Zakhor, "Experimental Results on Optical Proximity Correction With Variable Threshold Resist Model," *Proceedings of SPIE*, vol. 3051: *Symposium on Optical Microlithography X*, Santa Clara, Calif., Mar. 10-14, 1997, pp. 458-468.

Cobb, N., and A. Zakhor, "Fast, Low-Complexity Mask Design," *Proceedings of SPIE*, vol. 2440: *Symposium on Optical/Laser Microlithography VIII*, Santa Clara, Calif., Feb. 22-24, 1995, pp. 313-327.

Cobb, N., and A. Zakhor, "Fast Sparse Aerial Image Calculation for OPC," *Proceedings of SPIE*, vol. 2621: *15th Annual BACUS Symposium on Photomask Technology and Management*, Santa Clara, Calif., Sep. 20-22, 1995, pp. 534-545.

Cobb, N. "Flexible Sparse and Dense OPC Algorithms," *Proceedings of SPIE*, vol. 5853, *Photomask and Next-Generation Lithography Mask Technology XII*, Bellingham, Washington, 2005, pp. 693-702.

Cobb, N., and A. Zakhor, "Large Area Phase-Shift Mask Design," *Proceedings of SPIE*. vol. 2197: *Symposium on Optical/Laser Microlithography VII*, San Jose, Calif., Mar. 2-4, 1994, pp. 348-360.

Cobb., N., et al., "Mathematical and CAD Framework for Proximity Correction," Proceedings of SPIE, vol. 2726: *Symposium on Optical Microlithography IX*, Santa Clara, Calif., Mar. 13-15, 1996, pp. 208-222.

Cobb, N., and Y. Granik, "Model-Based OPC Using the MEEF Matrix," *Proceedings of SPIE*, vol. 4889: *22nd Annual BACUS Symposium on Photomask Technology*, Monterey, Calif., Sep. 30-Oct. 4, 2002, p. 147.

Cobb, N.B., et al., "New Concepts in OPC," *Proceedings of SPIE*, vol. 5377: *Optical Microlithography XVII*, Santa Clara, Calif., Feb. 24, 2004, pp. 680-690.

Cobb, N., and Y. Granik, "Using OPC to Optimize for Image Slope and Improve Process Window," (Nov. 20, 2002), *Proceedings of SPIE*, vol. 5130: *Photomask Japan*, Yokohama, Japan, Apr. 16-18, 2003, p. 42.

Benchmark Technologies, OPC Reference Standard (JIIIA) Reticle, Oct. 12, 1999.

Futatsuya, H., et al., "Model-based OPC/DRC Considering Local Flare Effects," *Proceedings of SPIE*, vol. 5377: *Optical Microlithography XVII*, Santa Clara, Calif., Feb. 24, 2004, pp. 451-458.

Granik, Y., "Generalized MEEF Theory," *Interface 2001*, Nov. 2001.

Granik, Y., and N. Cobb, "MEEF as a Matrix," *Proceedings of SPIE*, vol. 4562: *21st Annual BACUS Symposium on Photomask Technology*, Monterey, Calif., Oct. 2-5, 2001, pp. 980-991.

Granik, Y., and N. Cobb, "Two-Dimensional G-MEEF Theory and Applications," *Proceedings of SPIE*, vol. 4754: *Symposium on*

(56) References Cited

OTHER PUBLICATIONS

*Photomask and Next-Generation Lithography Mask Technology IX*, Yokohama, Japan, Apr. 23-25, 2002, pp. 146-155.

Mack, C.A., "Measuring and Modeling Flare in Optical Lithography," *Proceedings of SPIE*, vol. 5040: *Optical Microlithography XVI*, Santa Clara, Calif., Feb. 25, 2003, pp. 151-161.

Maurer, W., et al., "Process Proximity Correction Using an Automated Software Tool," *Proceedings of SPIE*, vol. 3334: *Optical Microlithography XI*, Santa Clara, Calif., Feb. 22-27, 1998, pp. 245-253.

Maurer, W., et al., "Evaluation of a Fast and Flexible OPC Package: OPTISSIMO," *Proceedings of SPIE*, vol. 2884: *16th Annual Symposium on Photomask Technology and Management*, Redwood City, Calif., Sep. 18-20, 1996, pp. 412-418.

Mentor Graphics Corporation, News & Views, Mar. 1999, <http://www.mentorg.co.jplN-V/99_3/dsm.html> [retrieved Nov. 7, 2006].

Mentor Graphics Corporation, News & Views, Mar. 1999, <http://www.mentorg.co.jp/N-V/99_3/opc.html> [retrieved Nov. 7, 2006].

Mentor Graphics Corporation, News & Views, Apr. 2000, <http://www.mentorg.co.jp/N- V/00_04/ppower.html> [retrieved Nov. 7, 2006].

Ohnuma, H., et al., "Lithography Computer Aided Design Technology for Embedded Memory in Logic," *Japanese Journal of Applied Physics* 37(12B):6686-6688, Dec. 1998.

"Resolution Enhancement Technologies (OPC/PSM)," Jul. 16, 2002, Mentor Graphics Internet Site, Technical Papers.

Randall, J., et al., "Lithography Simulation with Aerial Image—Variable Threshold Resist Model," *International Conference on Micro and Nano Engineering* (Sep. 1998), *Microelectronic Engineering*, 46:59-63, 1999.

Rieger, M.L., et al., "Using Behavior Modeling for Proximity Correction," *Proceedings of SPIE*, vol. 2197: *Optical/Laser Microlithography VII*, San Jose, Calif., Mar. 4, 1994, pp. 371-376.

Schellenberg, F., et al., "SEMATECH JIII Project: OPC Validation," *Proceedings of SPIE*, vol. 3334: *Optical Microlithography XI*, Santa Clara, Calif., Feb. 25, 1998, pp. 892-911.

Schellenberg, F., et al., "Design for Manufacturing in the Semiconductor Industry: The Litho/Design Workshops," *Proceedings of the 12th Int'l Conference on VLSI Design*, Jan. 10-13, 1999, pp. 111-119.

Schellenberg, F., "Sub-Wavelength Lithography Using OPC," *Semiconductor Fabtech*, 9th ed., Mar. 1999.

Spence, C., et al., "Integration of Optical Proximity Correction Strategies in Strong Phase Shifters Design for Poly-Gate Layers," *Proceedings of SPIE*, vol. 3873: *19th Annual Symposium of Photomask Technology*, Monterey, Calif., Sep. 15, 1999, pp. 277-287.

Stirniman, J., et al., "Optimizing Proximity Correction for Wafer Fabrication Processes," *Proceedings of SPIE*, vol. 2322: *14th Annual BACUS Symposium of Photomask Technology and Management*, Santa Clara, Calif., Sep. 16, 1994, pp. 239-246.

Vacca, A., et al., "Techniques to Detect and Analyze Photomask CD Uniformity Errors," *Proceedings of SPIE*, vol. 3873: *19th Annual Symposium on Photomask Technology*, Monterey, Calif., Sep. 15-17, 1999, pp. 209-214.

Washington, A., *Basic Technical Mathematics with Calculus*, 2d ed., 1970, pp. 245-247, 260-262, 505-525.

Yao, T., et al., "Local Flare Effects and Correction in ArF Lithography," *2003 Symposium on VLSI Technology Digest of Technical Papers*, Jun. 10-12, 2003, pp. 43-44.

\* cited by examiner

FRAGMENTATION POINT AND SIMULATION SITE ADJUSTMENT FOR RESOLUTION ENHANCEMENT TECHNIQUES

CROSS-REFERENCE TO RELATED APPLICATIONS

This is a divisional of U.S. patent application Ser. No. 12/972,097, filed Dec. 17, 2010, entitled "FRAGMENTATION POINT AND SIMULATION SITE ADJUSTMENT FOR RESOLUTION ENHANCEMENT TECHNIQUES," (now U.S. Pat. No. 8,566,753), which is a continuation of U.S. patent application Ser. No. 11/067,504, filed Feb. 25, 2005, entitled "FRAGMENTATION POINT AND SIMULATION SITE ADJUSTMENT FOR RESOLUTION ENHANCEMENT TECHNIQUES," (now U.S. Pat. No. 7,861,207), which claims the benefit of U.S. Provisional Patent Application No. 60/564,138, filed Apr. 21, 2004, entitled "METHOD FOR DYNAMICALLY ADJUSTING SITES FOR USE WITH OPC USING GRADIENTS OF AERIAL IMAGE," and 60/547,484, filed Feb. 25, 2004, entitled "CONCEPTS IN OPTICAL AND PROCESS CORRECTION." U.S. patent application Ser. No. 12/972,097, U.S. Pat. No. 7,861,207, U.S. Provisional Patent Application No. 60/564,138, and U.S. Provisional Patent Application No. 60/547,484 are all incorporated herein by reference in their entirety.

FIELD OF THE INVENTION

The present invention relates to photolithographic processing in general, and in particular to layout correction for resolution enhancement techniques such as optical and process correction (OPC).

BACKGROUND OF THE INVENTION

In the conventional photolithographic processing of integrated circuits, features are created on a semiconductor wafer by exposing the wafer with light or radiation that is passed through a mask or reticle. A typical mask/reticle has patterns of opaque and clear areas that selectively expose corresponding areas of light-sensitive chemicals on the wafer. The exposed areas are chemically and mechanically processed to create the desired features on the wafer.

As the size of features being created on a wafer approaches and becomes smaller than the wavelength of radiation used to expose the wafer, optical distortions can occur whereby the pattern defined on the mask or reticle will not match the pattern of features that are created on the wafer. To improve the pattern fidelity, changes can be made to the mask/reticle patterns that compensate for the expected optical distortions. One common tool for adjusting the mask/reticle pattern is an optical and process correction (OPC) tool such as the CALIBRE® software tools available from Mentor Graphics Corporation, the assignee of the present invention.

As will be appreciated by those skilled in the art, an OPC tool works to produce a corrected mask/reticle by reading at least a portion of a layout design that is defined in a database. Each feature to be created on the wafer is defined as a series of vertices that make up a polygon having a shape of the desired feature. The polygons are fragmented by dividing the perimeter of the polygon into a plurality of edge fragments. An edge placement error (EPE) is computed for each edge fragment that compares where an edge fragment will be printed on a wafer versus its desired position. The OPC tool then moves the edge fragments in order to precompensate for the expected optical distortions that will occur during processing so that the position of the edges created on a wafer will more closely match the desired positions.

FIG. 1A illustrates a representative polygon 10 that defines a rectangular feature to be created on a wafer. In order to correct for optical distortions, the polygon 10 is divided into a plurality of edge fragments that are bounded by fragmentation end points 12. During OPC, at least some of the edge fragments positioned between the fragmentation end points 12 are moved inwardly or outwardly to compensate for optical distortions. In the example shown in FIG. 1A, the polygon 10 does not contain a sufficient number of fragmentation points 12 to create the rectangular feature on the wafer with an acceptable image fidelity. A simulated aerial image 14 plots where the edge fragments will be printed on a wafer. In the example shown, the fragmentation of the polygon 10 is too coarse in order to be able to finely correct for the optical distortions that may occur during processing. Conversely, FIG. 1C illustrates a polygon 10 including more than enough fragmentation end points 12 to finely adjust for the optical distortions that may occur during processing. Although the number of fragmentation end points 12 is sufficient in the example shown in FIG. 1C, the time required to compute the OPC corrections of each individual edge fragment may be prohibitive. Therefore, it is desirable to divide the polygon 10 in a manner as shown in FIG. 1B with a sufficient number of fragmentation end points 12 so that image fidelity is acceptable and processing time is not prohibitive.

Associated with each edge fragment is a simulation site that defines a number of sample points at which the image intensity during photolithographic processing is estimated. From the estimated image intensity points, a determination is made of the expected edge placement error (EPE) of the edge fragment. FIG. 2 shows a conventional, simplistic method of placing the simulation sites on the edge fragments. Simulation sites 16a are placed in the center of the edge fragments that are at the ends of the polygon and simulation sites 16b are positioned at the location of the fragmentation end points 12 that are adjacent to the corners of the polygon. Additional simulation sites 16c are placed in the center of the edge fragments that are between the fragmentation end points 12 for the remainder of the polygon. Comparing the location of the simulation sites with simulated aerial image 18 (which is a plot of the estimated image intensity at a value that will expose the chemicals on the wafer), it can be seen that many simulation sites are not positioned at the place where the aerial image intensity deviates most significantly from the desired outline of the polygon 10. Therefore, if OPC corrections are made based on the location of the simulation sites as originally positioned, the most optimum edge correction will likely not be achieved.

To achieve improved OPC corrections, it is desirable to place the simulation sites and/or use varying numbers of simulation sites at positions closer to where the EPE of an edge fragment is greatest along the length of an edge fragment.

SUMMARY OF THE INVENTION

To improve a resolution enhancement technique such as optical and process correction (OPC) of features to be created with a photolithographic process, the present invention divides layout features into a number of edge fragments. Simulation sites are positioned on one or more of the edge fragments in order to perform an initial calculation of image intensity. One or more of the simulation sites are then moved to be closer to a point of greater edge placement error (EPE) for an edge fragment. In one embodiment of the invention, one or more of the initially placed simulation sites are repositioned based on an image intensity gradient vector angle that is calculated at the simulation sites.

In another embodiment, additional simulation sites are positioned at locations on an edge fragment where the image intensity gradient vector indicates a curve in the image intensity along the edge fragment. In yet another embodiment of the invention, additional sample points are added to a simulation site where image intensities are calculated. In yet another embodiment, additional fragmentation end points are added or removed in accordance with the estimated image intensity gradient vectors. Image intensity calculations or EPEs that are calculated from the image intensities at the additional simulation sites or the additional sample points, are used to determine a desired OPC correction for the edge fragments.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

To improve the optical and process correction of features to be created by a photolithographic process, the present invention uses a better placement of simulation sites and/or the addition of simulation sites, sample points or fragmentation end points to an edge fragment. Although the invention is primarily used in the creation of integrated circuits, it will be appreciated that the invention could be used with any feature to be created with a photolithographic process including Micro-Electrical-Mechanical Systems (MEMs), recording heads for disk drives, etc.

Figure 1A:
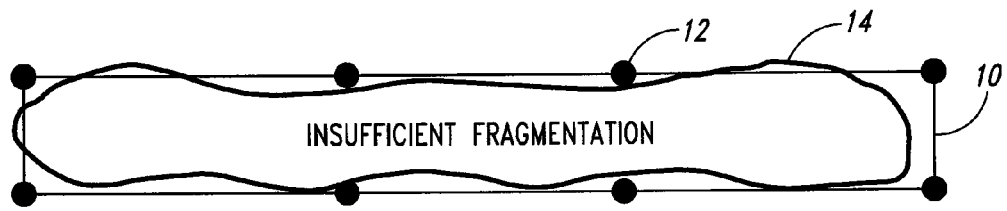
FIGS. 1A-1C illustrate a conventional method of fragmenting a polygon into a number of edge fragments prior to performing OPC.
Figure 1B:
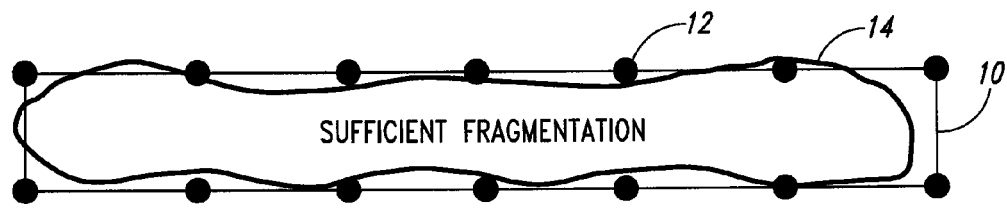
Figure 1C:
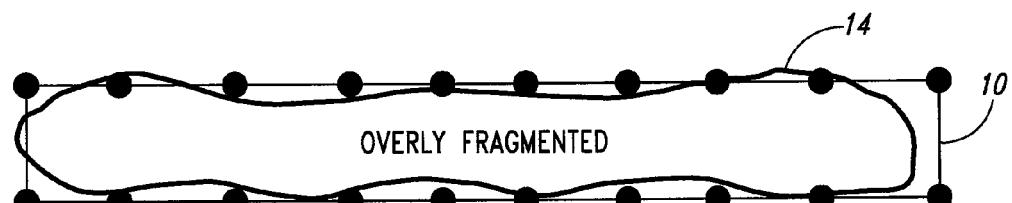
Figure 2:
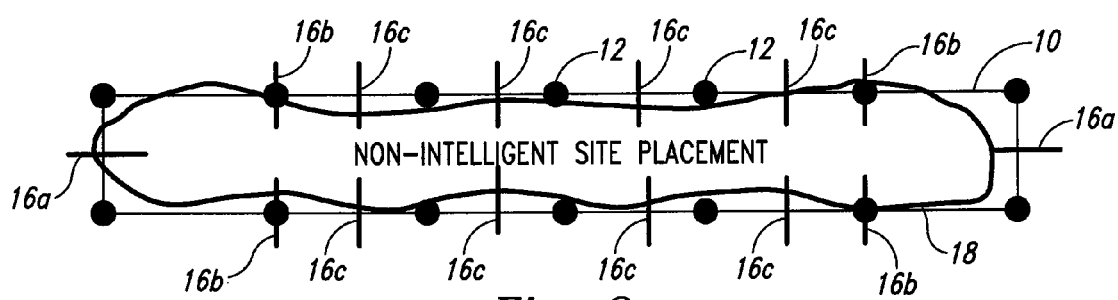
FIG. 2 illustrates a conventional method of positioning simulation sites on edge fragments.
Figure 3A:
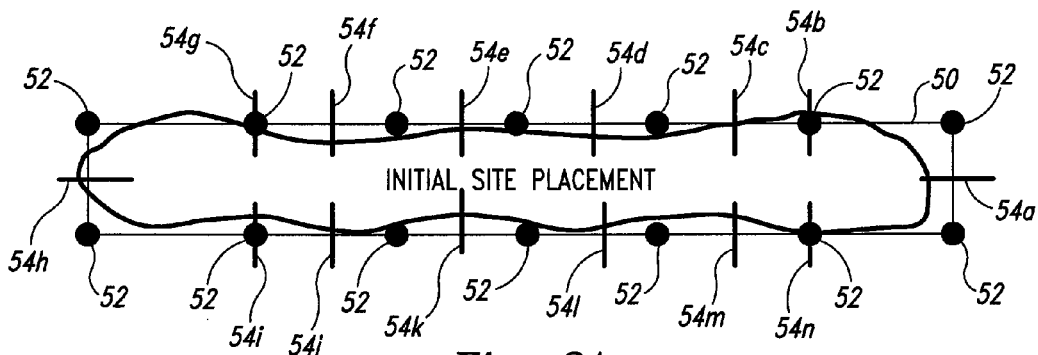
FIG. 3A illustrates a fragmented polygon having an initial simulation site placement in accordance with one embodiment of the present invention.

FIG. 3A illustrates a polygon 50 that defines a feature to be created on a wafer with a photolithographic process. The polygon 50 includes a number of fragmentation end points 52 that divide the perimeter of the polygon into a number of edge fragments. Associated with one or more of the edge fragments are simulation sites 54a, 54b, 54c . . . 54n, at which a number of the image intensity calculations are made. From the image intensity calculations, a determination can be made of the expected EPE for the corresponding edge fragment.

Figure 3B:
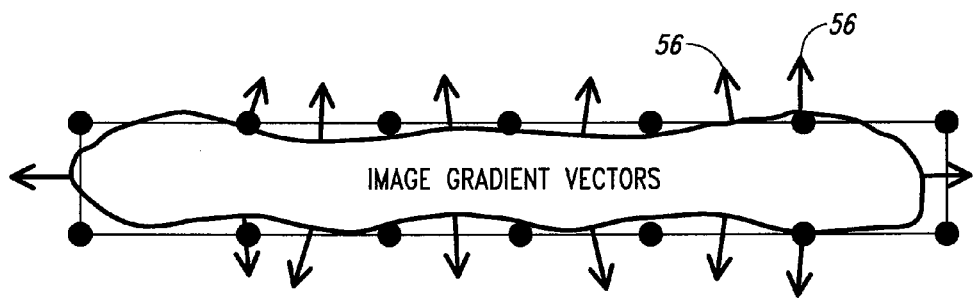
FIG. 3B illustrates a number of image intensity gradient vectors that are computed at the simulation sites shown in FIG. 3A in accordance with an embodiment of the present invention.

In one embodiment of the invention, the placement of one or more of the simulation sites 54a-54n is modified from their initial placement in order to improve the accuracy of the OPC corrections made to the edge fragments. As shown in FIG. 3B, a number of image intensity gradient vectors 56 are calculated at one or more of the initial simulation sites 54. In one embodiment of the invention, the image intensity gradient vectors 56 define the orientation of the image slope at the simulation site versus the orientation of the edge fragment.

As will be understood by those skilled in the art, each simulation site 54 includes a pattern of sample points at which the image intensity is simulated. The points generally form a cross with sample points oriented parallel to the edge fragment and sample points oriented perpendicular to the edge fragment. One method of calculating the image intensity gradient vector 56 is to estimate the image intensity at the sample points on either side of a center sample point and in a direction parallel to the edge fragment. Estimates of the image intensity on either side of the center sample point and in a direction perpendicular to the edge fragment are also made. From these estimates, a pair of vectors are computed and are mathematically combined in a head to tail fashion to compute the magnitude and direction of the image intensity at the area of the simulation site. The image intensity gradient vector 56 is indicative of the expected curvature of image intensity near the edge fragment.

Figure 3C:
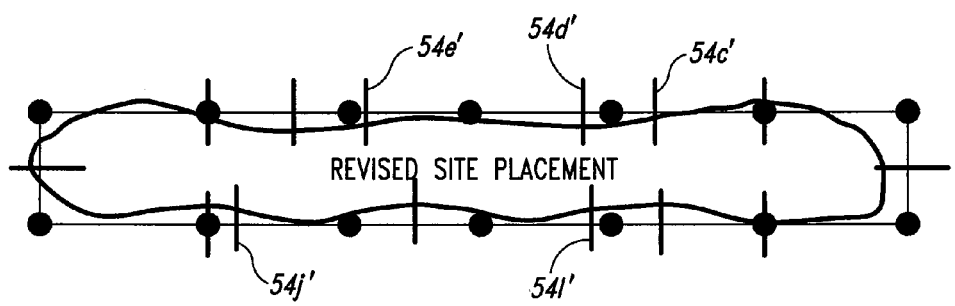
FIG. 3C illustrates a fragmented polygon having a revised simulation site placement in accordance with one embodiment of the present invention.

Once the image intensity gradient vectors have been calculated, the results may be stored for the corresponding simulation sites with a tag or other identifier. Next, one or more of the simulation sites 54 are repositioned to be closer to a point of greater image intensity curvature for the edge fragment. As shown in FIG. 3C, a simulation site 54c is moved to a position 54c', a simulation site 54e is moved to a position 54e', and a simulation site 54j is moved to position 54j', etc. With the simulation sites moved, a more accurate determination can be made how the edge fragments should be OPC corrected in order to produce better image fidelity.

Figure 3D:
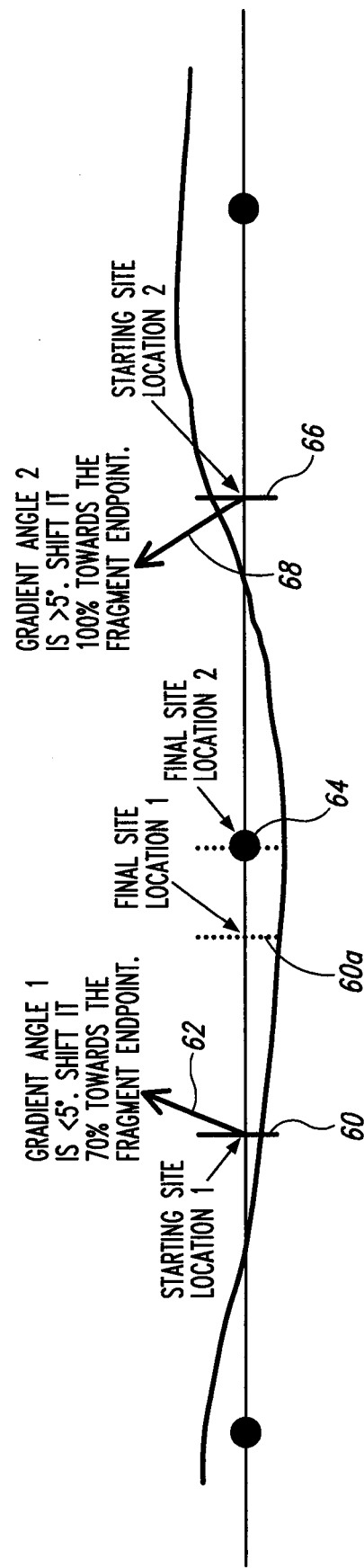
FIG. 3D illustrates one method of determining where a simulation site should be repositioned based on a computed image intensity gradient vector in accordance with one embodiment of the present invention.

FIG. 3D illustrates one example of moving a simulation site in accordance with the calculated image intensity gradient vector. At a simulation site 60, an image intensity gradient vector 62 is calculated to be oriented five degrees or less towards an adjacent fragmentation end point 64. Therefore, in one embodiment of the invention, the simulation site 60 is moved in the direction of the gradient to a position 60A that is 70% of the way between the original location of the simulation site 60 and the adjacent fragmentation end point 64. Similarly, at a simulation site 66, an image intensity gradient vector 68 is calculated to be oriented at an angle of greater than five degrees towards an adjacent fragmentation end point 64. Therefore, in one embodiment of the invention, the simulation site 66 is moved in the direction of the gradient, 100% of the way towards the adjacent fragmentation end point 64.

Although the example described above moves the simulation site in the direction of the gradient either 70% or 100% of the way towards an adjacent fragmentation end point, it will be appreciated that other distances could be used based on other magnitude and/or angle thresholds of the image intensity gradient vector. For example, if an image intensity gradient vector had an angle of less than 2°, no movement of the simulation site may be performed.

Figure 4A:
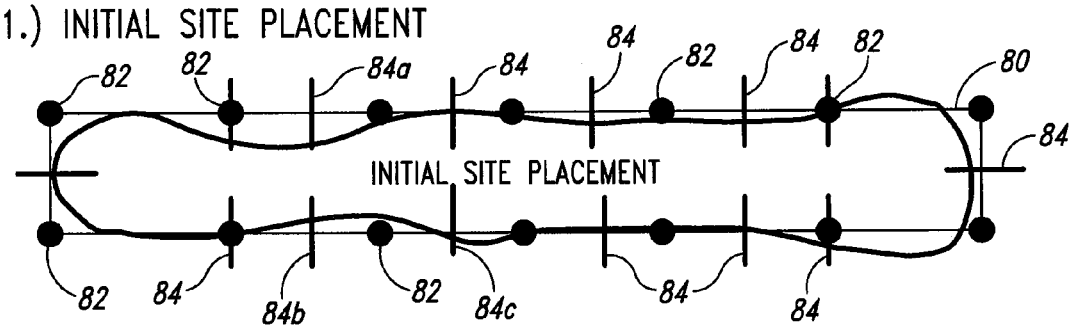
FIG. 4A illustrates a fragmented polygon having an initial simulation site placement in accordance with another embodiment of the invention.
Figure 4B:
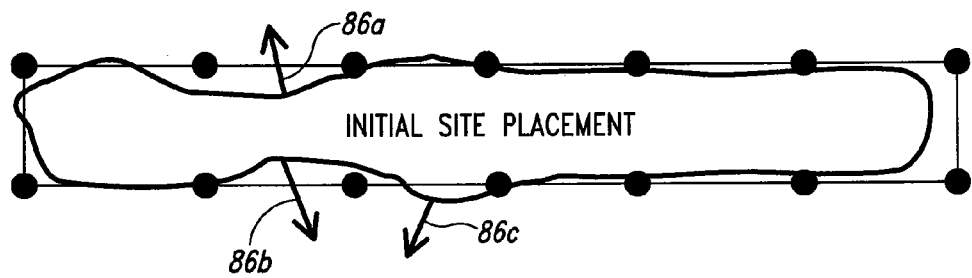
FIG. 4B illustrates a number of image intensity gradient vectors that are computed at several of the initial simulation site placements.
Figure 4C:
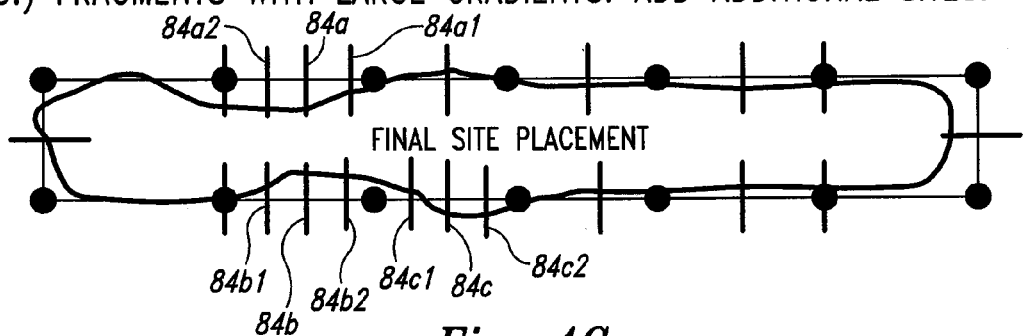
FIG. 4C illustrates a fragmented polygon having additional simulation sites added to edge fragments in accordance with the computed image intensity gradient vectors according to another embodiment of the present invention.

FIGS. 4A-4C illustrate another embodiment of the present invention. In this embodiment, a polygon 80 (FIG. 4A) is divided into a series of edge fragments using a number of fragmentation end points 82 that are positioned around the perimeter of the polygon 80. An initial placement of simulation sites 84 is made at which the image intensity is to be calculated. As shown in FIG. 4B, image intensity gradient vectors 86 are calculated at one or more of the simulation sites 84. For example, image intensity gradient vectors 86a, 86b, 86c are calculated at simulation sites 84a, 84b, and 84c respectively. If the image intensity gradient vector exceeds some predefined angle or magnitude, then one or more additional simulation sites 84a1 and 84a2 are added to the edge fragment on either side of the simulation site 84a (FIG. 4C). Similarly, additional simulation sites 84b1, 84b2, and 84c1, 84c2 are added adjacent the simulation sites 84b, 84c. In one embodiment, the additional simulation sites are positioned on either side of the original simulation site. However, other placements may be used.

Figure 5:
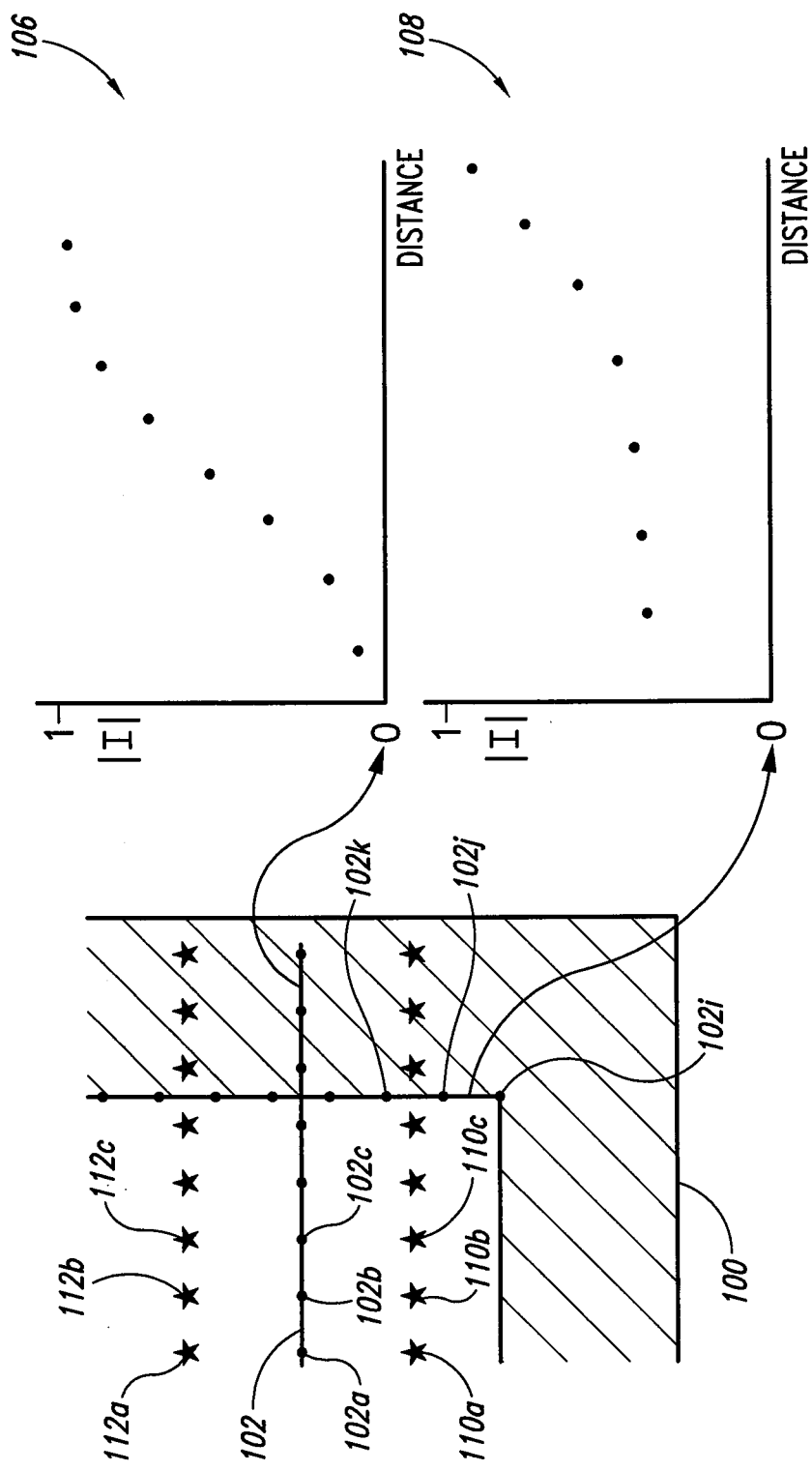
FIG. 5 illustrates a simulation site having additional sample points added in accordance with another embodiment of the present invention.

As an alternative to adding additional simulation sites to an edge fragment, each simulation site may have additional sample points added if the image intensity gradient vector exceeds a predefined angle or magnitude. As shown in FIG. 5, a polygon 100 representing a feature to be created by a photolithographic process includes a simulation site 102 having a number of sample points 102a, 102b, 102c, etc., that are oriented in a direction perpendicular to the orientation of a corresponding edge fragment. In addition, the simulation site 102 includes a number of sample points 102i, 102j, 102k, etc., that are oriented in a direction parallel with the edge fragment of the polygon.

A graph of the image intensity can be computed for the parallel and perpendicular sample points. For example, a graph 106 plots the changing image intensity as the sample points 102a, 102b, 102c get closer towards the edge of the polygon. A graph 108 plots the image intensity at the sample points along the edge fragment of the polygon. If the image intensity along the edge fragment had little or no curvature, the graph 108 should be relatively flat. However, if the graph 108 has a curve, the image intensity is likely not consistent along the length of the edge fragment. Therefore, in one embodiment of the invention, additional sample points 110a, 110b, 110c, etc., and 112a, 112b, 112c, etc., can be added to the simulation site 102 if the image intensity varies by more than a predetermined amount along the length of the simulation site. In one embodiment, the additional sample points 110, 112, are oriented in a direction perpendicular to the length of the edge fragment. The image intensities can be calculated at each of the new additional sample points 110, 112, and the information used to calculate how the edge should be moved during OPC.

Once the placement of the simulation sites has been determined, or additional simulation sites and/or sample points added, an expected edge placement error (EPE) is determined for the edge fragments. The EPE is used to determine how the edge fragment should be OPC corrected, if at all. If the edge fragment includes more than one simulation site, a decision must be made regarding which image intensity data should be used in correcting the position of the edge fragment during OPC. For example, in one embodiment, expected EPEs are calculated at each simulation site or along each set of sample points on the edge fragment. The maximum EPE is then used in the OPC correction of the edge fragment. Alternatively, the minimum EPE for the edge fragment could be used or the average or some other mathematical combination of the EPEs could be used to determine how much, and in which direction, the edge fragment should be moved to improve image fidelity.

In yet another embodiment, the image intensity or EPE of an edge fragment may also be computed at each of the simulation sites/sample points assuming differing process conditions, such as illumination intensity, illumination pattern, focus, polarization, partial coherence settings, long range flare, etc. The image intensities or EPEs computed under each of the different process conditions are used alone or in combination to determine the OPC correction and/or fragmentation of an edge fragment.

Although the disclosed embodiment of the invention calculates an expected EPE for each simulation site and uses the EPE data to determine an OPC correction for an edge, it will be appreciated that it is not necessary to calculate an EPE at each simulation site. Rather, the image intensity data computed at each simulation site or set of sample points can be used alone or in combination to determine the OPC correction of the edge fragment. In addition, the adjustment of the simulation sites and/or sample points may occur a single time or multiple times during an OPC correction process, such that each iteration adjusts the location or number of one or more simulation sites and/or the number of sample points.

Although the embodiments of the invention described above use the calculated image intensity gradient vector to adjust the position of a simulation site, to add simulation sites to an edge fragment or to add sample points to simulation sites, it will be appreciated that the calculated image intensity gradient vectors can also be used to adjust the fragmentation of the polygons. For example, in areas where the image intensity gradient vector indicates a curving image intensity, additional fragmentation end points may be added. Conversely, where the calculated image intensity gradients indicate little curvature in the intensity gradient, fragmentation end points can be removed. In another embodiment, fragmentation end points can be added where the contour of an estimated image intensity of a designated value such as that required to properly expose a wafer, crosses an edge fragment. This designated value may be determined by a constant exposure threshold or calculated using a lithographic process model. The crossing points may be determined by interpolating the calculated image intensities that are estimated for neighboring simulation sites. Increasing the number of fragmentation end points generally improves pattern fidelity by allowing finer OPC adjustments but requires increased processing time. Removing fragmentation end points improves processing time at a cost of decreased OPC resolution. These steps can be repeated iteratively to optimize each step of the OPC procedure as it executes.

After refragmentation, simulation sites are added to the newly created edge fragments. In one embodiment, simulation sites are initially placed with a rule such as placing the site at the center of each edge fragment or according to the position of neighboring features, etc.

The initial placement can then be revised by calculation of the image intensity gradient vectors at the simulation sites and repositioning the simulation sites, adding more sites, or adding sample points to existing simulation sites as described above. The process can be repeated in an iterative manner. Furthermore, simulation sites associated with the edge fragments that are unchanged may be adjusted as a result of adding or removing fragmentation end points.

Figure 6:
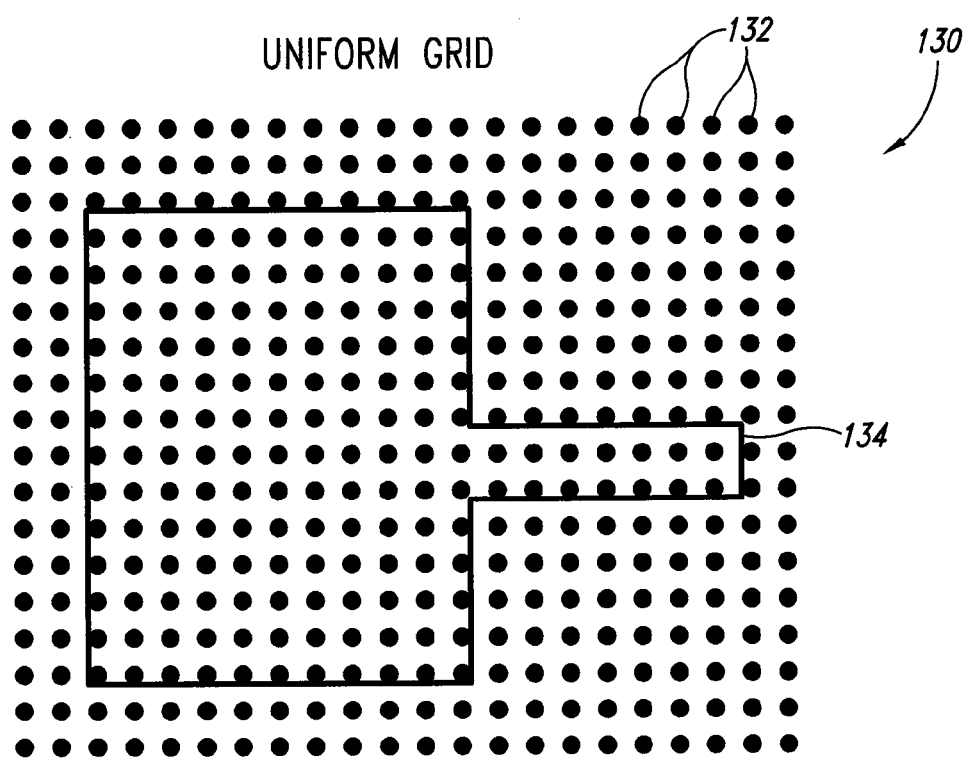
FIG. 6 illustrates a grid of sample points at which simulations are performed for fragmenting a feature in accordance with another embodiment of the invention.
Figure 7:
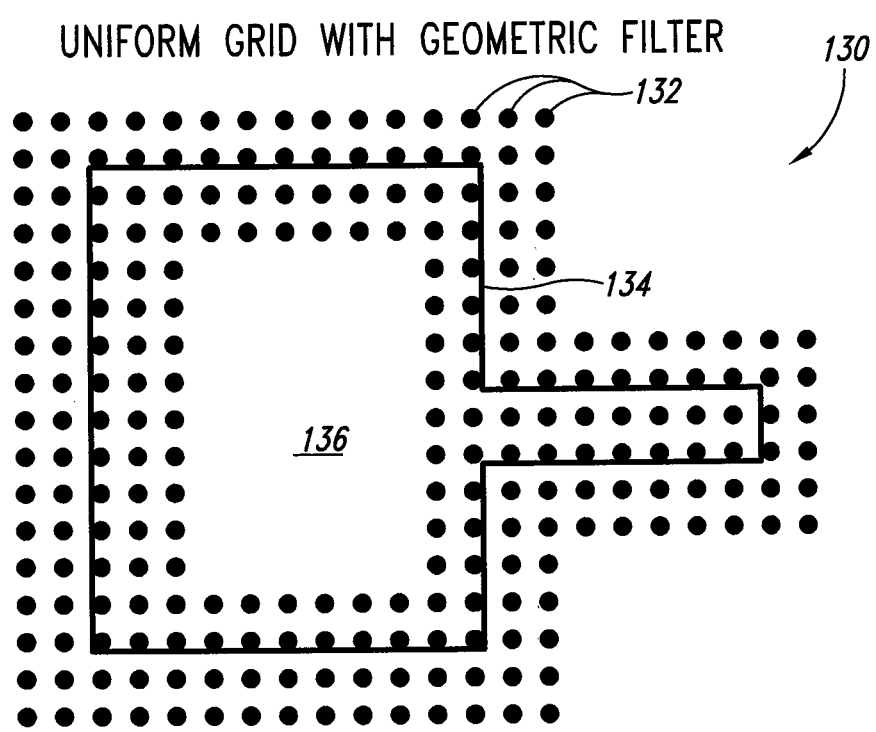
FIG. 7 illustrates a grid of sample points with a filter that eliminates sample points that are not in proximity to a feature edge.

In yet another embodiment, the initial fragmentation and simulation site selection can be based on simulations calculated on a fixed grid of sample points regardless of the layout under consideration. For example, FIG. 6 shows a uniform grid 130 of sample points 132 at which estimates of image intensity are calculated regardless of the position of a feature 134 in a layout. Alternatively, as shown in FIG. 7, the uniform grid 130 may include a geometric filter 136 to eliminate sample points 132 that are not near the boundaries of the feature 134.

Once image intensity estimates have been made at each of the sample points 132, the feature 134 is fragmented to form a series of edge fragments that are OPC corrected. The image intensity calculations at the sample points 132 can determine the proper location of the fragmentation end points. Fragmentation end points can be placed at positions that are the closest to a sample point 132 where the image intensity has the desired value. Alternatively, the image intensity values can be interpolated to determine where the image intensity threshold crosses an edge of the feature and therefore where the fragmentation end points should be located.

In some instances, the position of the one or more sample points 132 associated with an edge fragment may be moved in accordance with an image intensity gradient vector as described above. One or more of the sample points 132 is associated with or mapped to each edge fragment for OPC purposes. The mapping may be made with a rule such as selecting the closest sample points next to an edge fragment or selecting the sample point with the least desirable image intensity that is near the center of the edge fragment. Alternatively, more complex algorithms may be used. The mapping of a sample point to an edge fragment may be static or dynamic during OPC iterations, etc.

Figure 8:
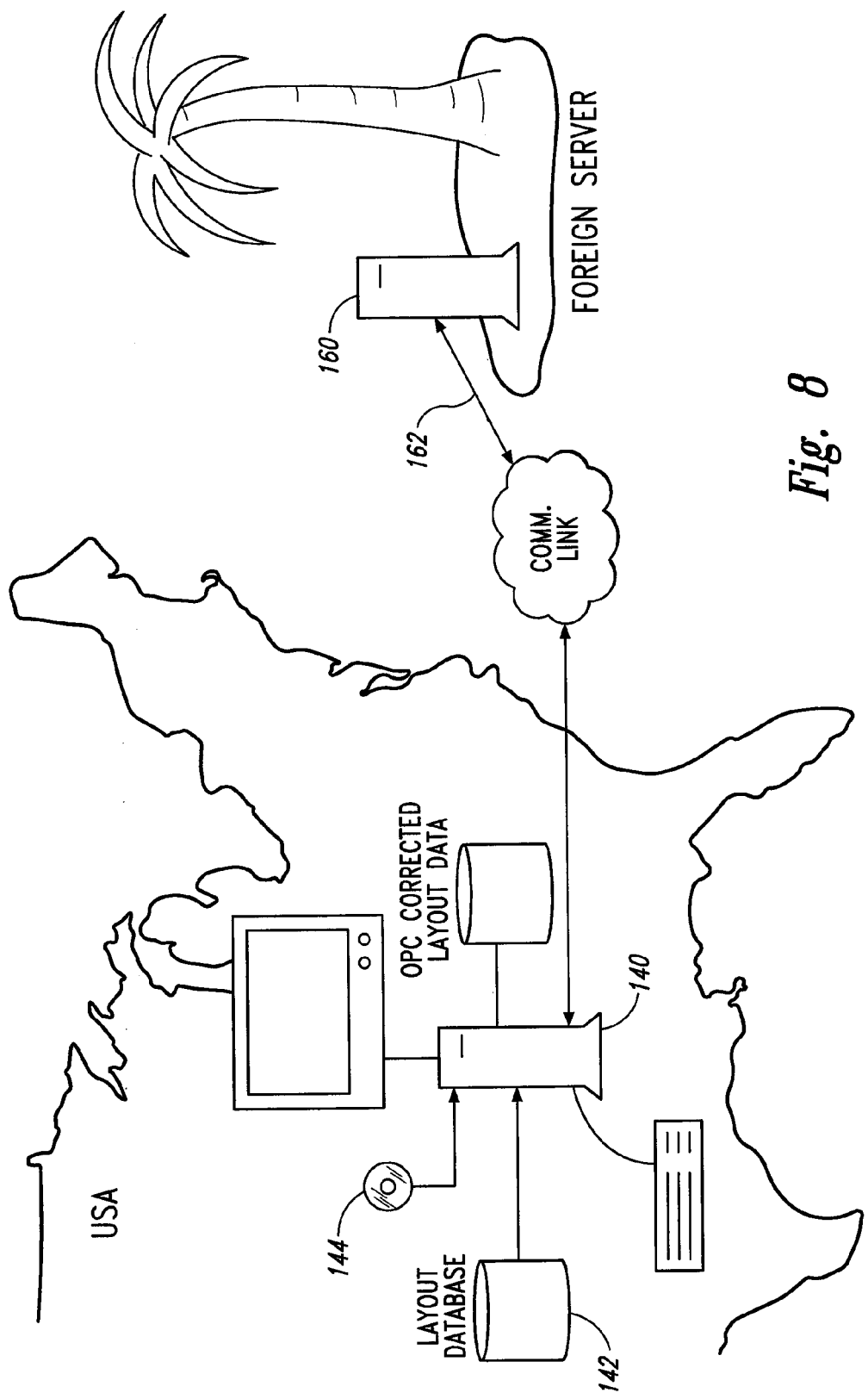
FIG. 8 illustrates one possible computing environment for performing the embodiments of the present invention.

FIG. 8 illustrates one possible computing environment for performing the present invention. A computer system 140 includes one or more processing units that perform a set of instructions that are stored on a computer readable media 142 or received embedded in a communication signal on a communication link to perform the methods of the present invention. An initial layout is stored in a conventional file format such as GDS-II, or an equivalent, on a database 142, computer readable media such as a CD, DVD, tape drive, etc., or is received over a communication link. The computer system 140 analyzes the layout to adjust the position of the simulation sites and/or adjusts the number of simulation sites/sample points or fragmentation end points in order to produce OPC corrected layout data in accordance with the embodiments of the invention as described above. The OPC corrected data is stored in a memory, on a computer readable media or in a database to be accessed by a mask writing tool (not shown) in order to produce one or more photolithographic masks or reticles used in a photolithographic process.

In an alternative embodiment of the invention, all or a portion of the initial layout can be transmitted to a remote computer system 160 that performs the fragmentation and simulation site selection/modification or re-fragmentation in accordance with the present invention. The remote computer system 160 may be in the same country as the computer system 140 or may be in a different country. The processed layout file or the OPC corrected layout data that is computed from the transmitted layout file is then transmitted to the computer system 140, or directly to the mask writing tool, via a wired or wireless communication link 162, such as the Internet, for use in creating photolithographic masks or reticles.

It will be appreciated that the relationship between fragmentation points and simulation sites and sample points can be complex. The techniques used in Matrix OPC, the subject of a previous U.S. patent application Ser. No. 10/387,224, hereby incorporated by reference, may also be applied to manage these relationships. While the disclosed embodiments have been primarily directed to performing OPC on the layout description, it will be appreciated that the present invention is also useful with other resolution enhancement techniques including: generating phase-shifting mask layouts, compensating for off-axis illumination systems, compensating for polarization effects and techniques for compensating for multiple exposures.

While the preferred embodiment of the invention has been illustrated and described, it will be appreciated that various changes can be made therein without departing from the scope of the invention. It is therefore intended that the scope of the invention be determined from the following claims and equivalents thereof.

The embodiments of the invention in which an exclusive property or privilege is claimed are defined as follows:

1. A method of defining a number of features to be created via a photolithographic process, the method comprising:
  with a computer,
    reading at least a portion of a layout data file defining the features to be created,
    estimating a number of image intensities at one or more simulation sites around each feature by estimating each of the image intensities at a first value of a process condition and at a second, different value of the process condition for the photolithographic process,
    calculating an image intensity gradient vector at one or more of the simulation sites,
    dividing each feature into a number of edge fragments, and
    determining a layout correction for an edge fragment based on a combination of the estimates of the image intensities under the first value and the second value of the process condition and the image intensity gradient vector, wherein the layout correction can be used in manufacturing a mask or reticle for fabricating the features with the photolithographic process.

2. The method of claim 1, wherein the first value and the second value are for differing focus conditions.

3. The method of claim 1, wherein the first value and the second value are for differing illumination conditions.

4. A computer readable storage device or memory on which data is stored defining a layout of a number of features to be created via a photolithographic process, wherein said data is created by the method of claim 1.

5. The method of claim 1, wherein the dividing is based on the estimated image intensities, the method further comprising:
  associating at least one of the image intensities at one or more of the simulation sites with an edge fragment for use in determining the layout correction.

6. The method of claim 5, wherein at least one of the features is fragmented into edge fragments having fragmentation end points that are positioned at locations where a contour of an image intensity of a designated value intersects with a feature edge.

7. The method of claim 6, further comprising:
moving the simulations sites in accordance with the image intensity gradient vectors.

8. The method of claim 5, further comprising:
removing edge fragments from at least one of the features where adjacent image intensity gradient vectors are substantially the same.

9. The method of claim 5, further comprising:
adding edge fragments to at least one of the features where adjacent image intensity gradient vectors vary by more than a predetermined amount.

10. The method of claim 9, wherein the simulation sites are in a uniform geometric pattern.

11. The method of claim 10, wherein the uniform pattern has a filter to eliminate simulation sites that are not adjacent to a border of at least one of the features.

12. The method of claim 1, further comprising:
moving the simulations sites in accordance with the image intensity gradient vectors.

13. The method of claim 1, further comprising:
removing edge fragments from at least one of the features where adjacent image intensity gradient vectors are substantially the same.

14. The method of claim 1, further comprising:
adding edge fragments to at least one of the features where adjacent image intensity gradient vectors vary by more than a predetermined amount.

15. The method of claim 1, wherein the process condition is one selected from the group consisting of the following: illumination intensity, illumination pattern, focus, polarization, partial coherence settings, and long range flare.

16. The method of claim 1, wherein the determining the layout correction comprises:
determining an edge placement error from the estimated image intensities; and
using the edge placement error to determine the layout correction.

17. The method of claim 1, wherein:
the process condition is a first process condition,
the image intensities are estimated at a first value and a second, different value for a plurality of process conditions for the photolithographic process;
the determining the layout correction for the edge fragment is based on a combination of the estimates of the image intensities under the at least a first value and a second, different value for the plurality of process conditions for the photolithographic process; and
the plurality of process conditions includes the first process condition.

18. A method of defining a number of features to be created via a photolithographic process, the method comprising:
with a computer,
reading at least a portion of a layout data file defining the features to be created,
dividing each feature into a number of edge fragments,
assigning one or more simulation sites to each of the one or more of the edge fragments,
estimating a number of image intensities or edge placement errors (EPEs) at each of the one or more simulation sites around each feature under a first value of a process condition and at a second, different value of the process condition for the photolithographic process,
adding, removing, or adding and removing one or more edge fragments based on an image intensity gradient vector associated with the simulation sites, and
determining at least one layout correction for an edge fragment based on a combination of the estimated image intensities under the first value and the second value of the process condition for simulation sites for the respective added or removed edge fragments, wherein the layout correction can be used in manufacturing a mask or reticle for fabricating the features with the photolithographic process.

19. The method of claim 18, wherein the estimating image intensities or EPEs comprises estimating an image intensity at the first value and the second value of a respective process condition for two or more differing process conditions for the photolithographic process, the two or more differing process conditions include at least one or more of the following: illumination intensity, illumination pattern, focus, polarization, partial coherence settings, or long range flare.

20. The method of claim 18, wherein the adding, removing, or adding and removing is performed after the estimating the image intensities or EPEs, and wherein an image intensity gradient vector associated with the simulation sites indicates a curving image intensity, wherein the determining the at least one layout correction is based at least in part on the added edge fragment.

21. The method of claim 18, wherein the adding, removing, or adding and removing is performed after the estimating the image intensities or EPEs, and wherein an image intensity gradient vector associated with the simulation sites indicates indicate little curvature in the intensity gradient, wherein the determining the at least one layout correction is based at least in part on simulation sites for features without the removed edge fragments.

22. The method of claim 18, wherein the dividing each feature and the assigning simulation sites are based on simulations calculated with a fixed grid of sample points.

23. The method of claim 18, further comprising, after the estimating the image intensities or EPEs:
placing at least one fragmentation end point at a position where the estimated image intensities or the EPEs have a respective desired value.

24. The method of claim 18, further comprising manufacturing an integrated circuit using the at least one layout correction.

25. One or more computer-readable storage devices or memory storing computer-readable instructions that when executed by a computer, cause the computer to perform a method of defining a number of features to be created via a photolithographic process, the method comprising:
reading at least a portion of a layout data file defining the features to be created;
estimating a number of image intensities at each of the one or more simulation sites around each feature at a first value of a process condition and at a second, different value of the process condition for the photolithographic process;
dividing each feature into a number of edge fragments based on the estimated image intensities;
calculating an image intensity gradient vector at one or more of the simulation sites;
determining a layout correction for an edge fragment based on a combination of the estimates of the image intensities estimated under the first value and the second value of the process condition and the image intensity gradient vector, wherein the layout correction can be used in manufacturing a mask or reticle for fabricating the features with the photolithographic process; and associating an image intensity at one or more of the simulation sites with an edge fragment for use in determining the layout correction.

26. The computer-readable storage devices or memory of claim 25, wherein the method further comprises assigning one or more simulation sites to at least one of the edge fragments, and wherein the simulation sites have additional sample points added because the image intensity gradient vector exceeds a predefined angle or magnitude.

* * * * *